Patented Sept. 27, 1932

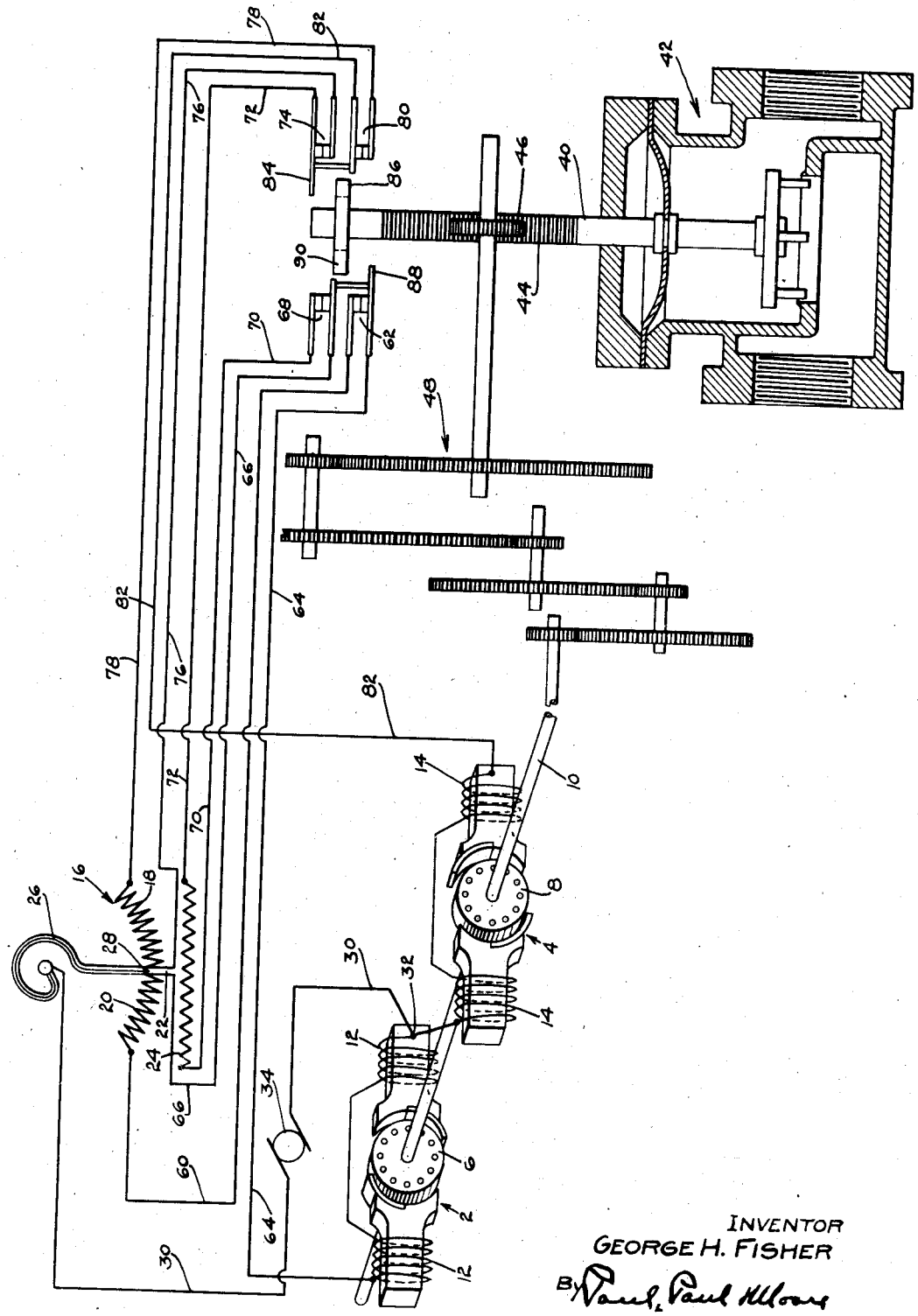

1,879,154

UNITED STATES PATENT OFFICE.

GEORGE H. FISHER, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

LIMIT FOR OPPOSED MOTOR CONTROL SYSTEMS

Application filed May 16, 1931. Serial No. 537,899.

The present invention relates to remote control systems and more particularly to such systems in which the control is effected by means of a pair of opposing motors adapted to receive varying amounts of current proportioned by a suitable control device. A description of such a system appears in the application of Paul F. Shivers, Serial Number 537,884, filed May 16, 1931.

Opposed motor control systems of this character rely for operation upon the uneven distribution of current to a pair of opposed motors. Upon the existence of a difference in the amount of current supplied to each of the motors, the rotors of the motors will have a corresponding difference in torque and the object being controlled will be actuated in the direction of the rotor of greater torque. The current flowing to the motors is preferably proportioned by means of a controlling element connected to a variable resistance lying in a Wheatstone bridge circuit. When the controlling element is so positioned that an unequal distribution of current to the motors is effected, their rotors will rotate or tend to rotate until the control member is brought back to the position at which each motor receives an equal amount of current. Thus the motors may tend to actuate the object being controlled even after it has reached its limit of travel unless some provision is made for limiting the operation of the controlling motors. Where the system has a thermally responsive control member and the object to be controlled is some control element of a heating system, it has been proposed to place reduction gearing between the motors and the object being controlled of such ratio that the controlled object will not reach its limit of travel before the thermally responsive control member is moved back to the point at which equal currents are supplied to the motors or at which the ratio of supply to the motors is reversed. That is, the reduction gearing is intended to be of such a ratio that the difference in temperature which is intended to be set up by actuation of the controlled member will be effected and produce a response in the thermally responsive control member, before the controlled member reaches its limit of travel. The reduction gearing produces a time lag in which the desired temperature change is capable of being effected by the heating system under ordinary circumstances. However it is possible that a condition may occur in which the element being controlled reaches the limit of its travel before a response on the part of the control element has taken place. For example, when starting up a cold heating installation a fuel valve may be completely opened before the temperature rises sufficiently to close it by means of the control system.

Accordingly, it is a general object of this invention to provide means in an opposed motor remote control system for limiting the operation of the motors to actuation of the controlled member within a predetermined limit of travel.

A further object of the invention is the provision of simplified means in such a system for rendering the motors inoperative to move a controlled object outside predetermined limits of travel while maintaining them operative for movement of the controlled object within its limits of travel.

Still another object of the invention is the provision of a system in which the motors are disconnected from their source of power when the controlled object exceeds a limit of travel.

These and other objects of the invention will become more readily apparent upon a reading of the specification together with the drawing and accompanying claims.

In the drawing, which is illustrative of the invention, the single figure is a diagrammatic showing of one form of opposed motor control system having means limiting the actuation of the controlled member in accordance with this invention.

Referring to the figure, it will be observed that the field windings 12 and 14 of the motors 2 and 4 which have their rotors 6 and 8 fixed on a common shaft 10 are connected in series in the loop of a Wheatstone bridge circuit also including the composite resistance 16. The bridge line of the Wheatstone bridge circuit comprises wire 30, connected to any convenient source of electrical energy 34, and bi-metallic element 26 which is a conductor of electricity and which moves in response to changes in the temperature of its surrounding medium in well known manner.

The bi-metallic strip 26 is provided with contact 28 at its lower end for engagement with the exposed windings of the resistances 18 and 20 of the composite resistance 16 which includes resistance 24 connected in series across the slight gap 22 which separates resistances 18 and 20.

The fields 12 and 14 each constitute separate resistances in the loop, and those parts of the composite variable resistance 16 on either side of contact 28 form the other resistances of the loop. Resistances 18 and 20 are preferably of such value with respect to the resistance offered by fields 12 and 14 that the bridge is in balance when the contact 28 is positioned midway between the resistances 18 and 20 as shown in the drawing.

If it be assumed that the temperature rises and thermostat 26 moves contact 28 to the left of position shown in Fig. 1 to a point in the middle of resistance 20, the left branch of the loop of the Wheatstone bridge circuit will constitute left half of resistance 20, wire 60, switch 62, wire 64, field coils 12, to point 32 where wire 30 makes connection with the loop. The right branch of the loop would comprise under similar circumstances right half of resistance 20, wire 66, switch 68, wire 70, resistance 24, wire 72, switch 74, wire 76, resistance 18, wire 78, switch 80, wire 82, field coils 14, to point 32.

The element to be controlled is shown in this case as a valve generally designated at 42, for a fuel conduit or the like, whose stem 40 is provided with rack teeth 44 meshing with a pinion 46 which in turn is in connection with the common rotor shaft 10 through the reduction gearing generally designated at 48. Upon rotation of the shaft 10 the valve stem will be raised or lowered depending upon the direction of the rotation.

The switches 62, 68, 74 and 80 are closed during the operation of the valve between its uppermost and lowermost limits. However, switches 74 and 80 are provided with a trip 84 which will operate to open the contacts of both switches when engaged and raised by the arm 86 fixed to the top of the valve stem. This point of engagement between trip 84 and arm 86 represents the uppermost limit for the travel of the valve stem. Similarly, switches 62 and 68 are provided with a trip 88 which will be engaged by the arm 90 on the valve stem to effect an opening of the contacts of switches 62 and 68 when the valve exceeds its lowermost limit of travel. The trips 84 and 88 and the members connecting the individual switches of each switch pair are of course insulated from the switch contacts in accordance with usual practice.

During operation, the contact 28 will move back and forth with fluctuations in the temperature of its surrounding medium. As the contact moves to one side or other of the slight gap 22, the relative amounts of current flowing through the fields of the motors will vary and since the fields of the motors are so shaded as to cause one to oppose the other, shaft 10 will rotate in the direction of the rotor of greater torque. This movement of shaft 10 is communicated to the valve 42 through the reduction gearing 48 to open or close the valve as the case may be, and in the normal course of events the valve will not reach fully closed or open position before its partial opening or closing has changed the temperature of the medium about the bi-metallic element sufficiently to move contact 28 into a position to either stop rotation of the shaft 10 or reverse it. That is, there will be a response by the thermostat due to changed temperature conditions before the valve reaches its limit.

To illustrate the operation of the device in a case where there is no response by the bi-metallic element before the valve has reached the end of its travel, let it be assumed that a fall in temperature causes the bi-metallic strip to move contact 28 to the right whereas a rise in temperature causes the contact to be moved to the left. If the temperature now falls, the resistance in series with the field coil 14 will be decreased and that is series with the field coil 12 will be increased so that rotor 8 will have a greater torque than rotor 6 and the shaft 10 will rotate in the direction determined by the rotor of greater torque, for instance in counter-clockwise direction. It may further be assumed that such rotation results in an opening movement of the valve 42. If the valve now reaches the uppermost limit of its travel before the temperature conditions at the bi-metallic control element are such as to move the contact back to neutral position in the gap between the resistances 18 and 20, the arm 86 will engage the trip 84 to open the switches 74 and 80. It will be observed that these switches are in the right and left branches of the loop so that no current whatsoever can flow from the power source 34 to the motors 2 and 4 when the switches are open. The position of the valve is now such that it is at the uppermost end of its travel and connections through both branches of the loop of the Wheatstone bridge circuit are broken so that no current flows to the motors.

As the valve remains open to supply more fuel, for instance, it may be assumed that the temperature of the medium surrounding the bi-metallic element 26 will rise and cause the contact 28 to be moved to the left. Until contact 28 reaches the gap both motors will remain disconnected from the source of power but after the contact engages resistance 20, the following circuit will be closed through the field of the motor 2 to rotate the shaft 10 in clockwise direction, thereby to lower the valve stem and allow the contacts of the switches 74 and 80 to close: source of electricity 34, wire 30, bi-metallic element 26, contact 28, resistance 20, wire 60, switch 62, wire 64, field coils 12, wire 30, source of electricity 34. It will be noted that all of the power is sent directly through field motor 2 at the instant contact 28 engages resistance 20, the field of motor 4 being disconnected. However, as soon as the switches 74 and 80 are again closed, the motor 4 will be thrown into the circuit and act as a brake for motor 2 in the usual manner.

So also, both motors are disconnected upon opening of the switches 62 and 68 as a result of engagement of the arm 90 with trip 88 at the lowermost point of travel of the valve. Following the previous assumptions, the bi-metallic element 26 and its contact 28 must be positioned to the left of the gap 22 and in engagement with resistance 20 when the valve reaches its lower limit. If the temperature subsequently drops a sufficient amount to cause the contact 28 to be moved beyond the gap 22 into engagement with the resistance 18, the field of motor 4 will be connected to the source of energy through the following circuit, and rotate the shaft 10 in counter-clockwise direction thereby to raise the valve and enable the switches 62 and 68 to close: source of electricity 34, wire 30, bi-metallic element 26, contact 28, resistance 18, wire 78, switch 80, wire 82, field coils 14, wire 30, and electrical source 34. In this case it is also found that the actuating motor receives the full power at the instant contact 28 engages coil 18 but this condition is corrected as soon as the switches 62 and 68 are closed at which time the motor 2 is again thrown into the circuit to act as a brake for motor 4.

The resistance 24 is used in conjunction with the resistances 18 and 20 in order to improve the sensitivity of the system. Before rotation of the rotor shaft 10 can occur, there must be an appreciable difference in torque between the rotors 6 and 8 in order to overcome friction and starting inertia. By bridging the slight gap 22 with a relatively great resistance, it is possible to effect appreciable resistance variations in the respective branches of the loop upon only very slight movements of the contact 28 from one side to the other of neutral or balanced position. Consequently, appreciable differences in the currents supplied to fields 12 and 14 are set up and there will then be a sufficient difference in torque to overcome the starting inertia and friction upon only a slight deviation of contact 28 from neutral position. It will be observed that the resistance 24 is always in that branch of the loop of the Wheatstone bridge circuit which includes the resistance 18 or 20 which is not being engaged by the contact.

References in the following claims to a pair of opposing motors will be understood to include any desired type of opposed electrically actuated devices as well as an arrangement comprising a single armature having opposed fields.

I claim as my invention:

1. In an electrical remote control system for controlling the travel of an object between predetermined limits, a pair of opposing motors having their fields connected in series, a pair of series connected resistances connected in series with said motor fields to form a closed loop, a source of electrical energy connected to the loop, a bridge line connected to said loop between said fields at one end and having a movable contact adapted to slidably engage exposed surfaces of said resistances at its other end, means connecting the motors and object being controlled for actuating the latter upon rotation of the former, and means associated with the controlled object for disconnecting the motor fields from the electrical source when said object exceeds a predetermined limit of travel.

2. An electrical remote control system for controlling the travel of an object between predetermined limits, comprising a pair of opposing motors, a common source of electricity for said motors, circuit conductors for supplying current to said motors simultaneously from the source, variable resistance means controlling the flow of electricity to said motors from the common source, a thermally responsive element controlling said variable resistance means, mechanical means connecting the object being controlled with said motors for actuating the former upon rotation of the latter, means associated with said controlled object for disconnecting said source of electricity from the motors when the object reaches a predetermined limit of travel, and means associated with said thermally responsive element for connecting at least one of said motors with the electrical source thereby to actuate the controlled object to a point within its predetermined limit of travel after it has exceeded the same.

3. In an electrical remote control system for controlling the travel of an object within a predetermined limit, a pair of opposing motors having their fields connected in series, a pair of series connected resistances connected in series with said motor fields to form a closed loop, an electrical energy source, a bridge line communicating with the source of electricity and connected at one end to said loop between said fields, a movable contact at the other end of the bridge line adapted to slidably engage exposed surfaces of said resistances, a switch in the loop at a point between said resistances, a second switch in a branch of the loop connecting the pair of resistances with the pair of motor fields, said switches being adapted to be closed when the controlled object is within its predetermined limits, and means associated with the object being controlled for opening said switches when said object exceeds its predetermined limit.

4. In an electrical remote control system for controlling the travel of an object between predetermined limits, a pair of opposing motors, a pair of resistances, said resistances and the fields of said motors being connected in series in a closed loop, an electrical energy source, a bridge wire communicating with the source of electricity and connected at one end to said loop at a point between said motor fields, a movable contact at the other end of the bridge wire adapted to slidably engage exposed surfaces of said resistances, a pair of switches within the loop between said resistances, a second pair of switches each in one of the branches of the loop connecting the pair of resistances with the pair of motor fields, said switches all being adapted to be closed when the controlled object is within its predetermined limits, and means associated with the object being controlled for opening one of said second switches and the adjacent switch between the resistances when said object exceeds a predetermined limit.

5. In an electrical remote control system for controlling the travel of an object within a predetermined limit, a pair of opposing motors having their fields connected in series, a pair of series connected resistances connected in series with said motor fields to form a closed loop, an electrical energy source, a bridge wire communicating with the source of electricity and connected at one end to said loop at a point between said fields, a movable contact at the other end of the bridge wire adapted to slidably engage exposed surfaces of said resistances, a thermally responsive device for actuating said movable contact, a switch in the loop at a point between said resistances, a second switch in a branch of the loop connecting the pair of resistances with the pair of motor fields, said switches being adapted to be closed when the controlled object is within its predetermined limit, and means associated with the object being controlled for opening said switches when said object exceeds its predetermined limit.

6. In an electrical remote control system for controlling the travel of an object within a predetermined limit, a pair of opposing motors, a composite resistance comprising a pair of reistances separated by a slight gap bridged by a third resistance, said composite resistance and the fields of said motors being connected in series in a circuit forming a closed loop, an electrical energy source, a bridge wire communicating with the source of electricity and connected at one end to said loop at a point between the fields, a movable contact at the other end of the bridge wire adapted to slidably engage exposed surfaces of said pair of resistances, a switch in the loop between one of said pair of resistances and said third resistance, a second switch in the branch of the loop adjacent the first said switch which connects the composite resistance with said pair of motor fields, said switches being adapted to be closed when the controlled object is within a predetermined limit, and means associated with the object being controlled for opening said switches when said object exceeds said predetermined limit.

7. In an electrical remote control system for controlling the travel of an object within predetermined limits, a pair of opposing motors, a composite variable resistance connected in series in a closed loop with the fields of said motors, said composite variable resistance comprising a pair of resistances separated by a slight gap bridged by a third resistance connected in series with said pair and having a slidable contact adapted to travel over exposed surfaces of said pair of resistances, an electrical energy source, a bridge wire communicating with the source of electrical energy and connected to the loop between the motor fields at one end and to the aforesaid movable contact of the composite variable resistance at its other end, a thermally responsive element actuating said movable contact, a pair of switches each in the loop between one of said pair of resistances and said third resistance, a second pair of switches each in one of the branches of the loop connecting the composite variable resistance with the pair of series connected motor fields, all of said switches being adapted to be closed when the controlled object is within its predetermined limits of travel, and means associated with the object being controlled for opening one of the first said switches and the second said switch in the branch adjacent such first said switch when the controlled object exceeds a predetermined limit of travel.

8. In an electrical remote control system for controlling the travel of an object between predetermined limits, a pair of opposing motors having their fields connected in series, a pair of resistances connected in series with said motor fields to form a closed loop, means for varying the relative values of said resistances, a source of electrical energy connected to said loop, a bridge line connected to said loop between said motor fields at one end and between said resistances at its other end, means connecting the motors and object being controlled for actuating the latter upon rotation of the former, and means associated with the controlled object for disconnecting the motor fields from the electrical source when said object exceeds a predetermined limit of travel.

In witness whereof, he has hereunto set his hand this 11th day of May, 1931.

GEORGE H. FISHER.